US006941446B2

(12) United States Patent
Stein et al.

(10) Patent No.: US 6,941,446 B2
(45) Date of Patent: Sep. 6, 2005

(54) SINGLE INSTRUCTION MULTIPLE DATA ARRAY CELL

(75) Inventors: Yosef Stein, Sharon, MA (US); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 529 days.

(21) Appl. No.: 10/090,941

(22) Filed: Mar. 5, 2002

(65) Prior Publication Data

US 2003/0140212 A1 Jul. 24, 2003

Related U.S. Application Data

(60) Provisional application No. 60/350,398, filed on Jan. 21, 2002.

(51) Int. Cl.[7] .............................................. G06F 15/80
(52) U.S. Cl. ........................................................ 712/22
(58) Field of Search .................................... 712/20, 22

(56) References Cited

U.S. PATENT DOCUMENTS

| | | | |
|---|---|---|---|
| 3,805,037 A | 4/1974 | Ellison | |
| 4,722,050 A | 1/1988 | Lee et al. | |
| 4,847,801 A | 7/1989 | Tong | |
| 4,852,098 A | 7/1989 | Brechard et al. | |
| 4,918,638 A | 4/1990 | Matsumoto et al. | |
| 5,095,525 A | 3/1992 | Almgren et al. | |
| 5,182,746 A | 1/1993 | Hurlbut et al. | |
| 5,214,763 A | 5/1993 | Blaner et al. | |
| 5,379,243 A | 1/1995 | Greenberger et al. | |
| 5,446,850 A | 8/1995 | Jeremiah et al. | |
| 5,577,262 A | 11/1996 | Pechanek et al. | |
| 5,689,452 A | 11/1997 | Cameron | |
| 5,708,836 A | * 1/1998 | Wilkinson et al. ............ 712/20 |
| 5,752,068 A | * 5/1998 | Gilbert ........................ 712/16 |
| 5,872,988 A | * 2/1999 | Duranton .................... 712/22 |
| 6,049,815 A | 4/2000 | Lambert et al. | |
| 6,199,086 B1 | 3/2001 | Dworkin et al. | |
| 6,199,087 B1 | 3/2001 | Blake et al. | |
| 6,230,179 B1 | 5/2001 | Dworkin et al. | |
| 6,246,768 B1 | 6/2001 | Kim | |
| 6,317,819 B1 | 11/2001 | Morton | |
| 6,349,318 B1 | 2/2002 | Vanstone et al. | |
| 6,434,662 B1 | 8/2002 | Greene et al. | |
| 6,581,152 B2 * | 6/2003 | Barry et al. .................. 712/24 |
| 6,587,864 B2 | 7/2003 | Stein et al. | |

(Continued)

FOREIGN PATENT DOCUMENTS

EP  1 246 389 A1  10/2002

OTHER PUBLICATIONS

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

(Continued)

*Primary Examiner*—William M. Treat
(74) *Attorney, Agent, or Firm*—Iandiorio & Teska

(57) ABSTRACT

A single instruction multiple data (SIMD) array cell for processing a data stream, the array including a plurality of cells, each cell having a memory circuit for storing a predetermined region of the data stream; a location register circuit for representing the size and location of the predetermined region of the data stream; a unique identification number; and an arithmetic logic unit responsive to the identification number and a single command common to all cells in a load mode to compute a unique start position for its cell for receiving the predetermined region of the direct memory access data stream. In an execution mode the command word includes an address field applicable to all cells, a data field and an instruction to be performed by the arithmetic logic unit. The arithmetic logic unit in each cell performs the instruction directly on the local value at that address in its memory with the data in the data field.

14 Claims, 7 Drawing Sheets

U.S. PATENT DOCUMENTS

| | | |
|---|---|---|
| 2002/0041685 A1 | 4/2002 | McLoone et al. |
| 2002/0147825 A1 | 10/2002 | Stein et al. |
| 2002/0174318 A1 * | 11/2002 | Stuttard et al. .............. 712/13 |
| 2003/0103626 A1 | 6/2003 | Stein et al. |
| 2003/0105791 A1 | 6/2003 | Stein et al. |
| 2003/0110196 A1 | 6/2003 | Stein et al. |
| 2003/0115234 A1 | 6/2003 | Stein et al. |
| 2003/0133568 A1 | 7/2003 | Stein et al. |
| 2003/0140211 A1 | 7/2003 | Stein et al. |
| 2003/0140213 A1 | 7/2003 | Stein et al. |
| 2003/0149857 A1 | 8/2003 | Stein et al. |

OTHER PUBLICATIONS

Máire McLoone and J.V. McCanny, *High Performance Single-Chip FPGA Rijndael Algorithm Implementations*, CHES 2001 PROC, LNCS 2162, 65–76 (C.K. Koç et al. eds. May 16, 2001).

Elixent, *Changing the Electronic Landscape* (2001) <http://www.elixent.com> (elixent—Bristol, UK).

Elixent Application Note *JPEG Codec* (Dec. 9, 2002) <http://www.elixent.com/assets/jpeg-coder.pdf> (elixent—Bristol, UK).

U.S. Appl. No. 10/440,330, filed May 16, 2003, Stein et al.

U.S. Appl. No. 10/395,620, filed Mar. 24, 2003, Stein et al.

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

* cited by examiner-

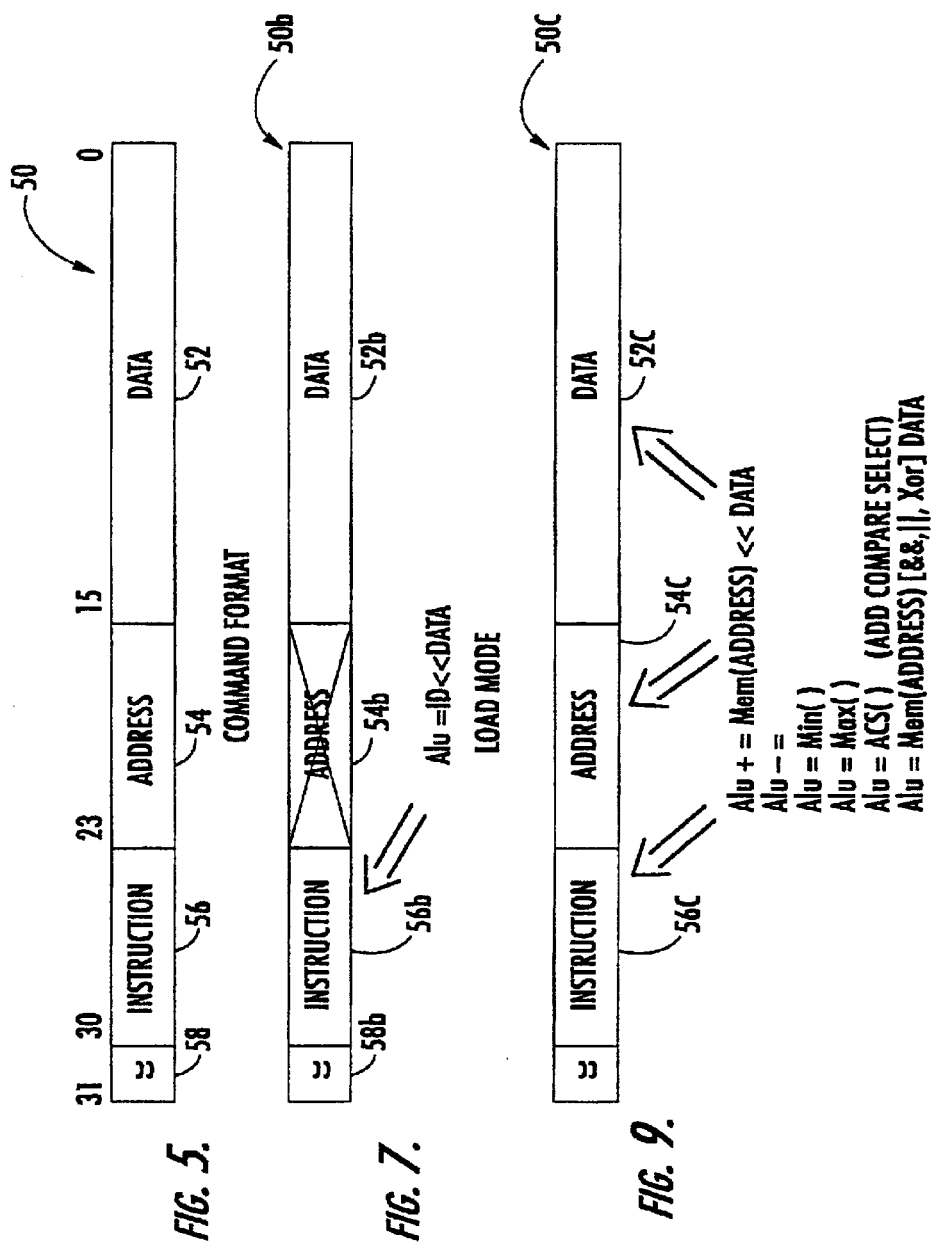

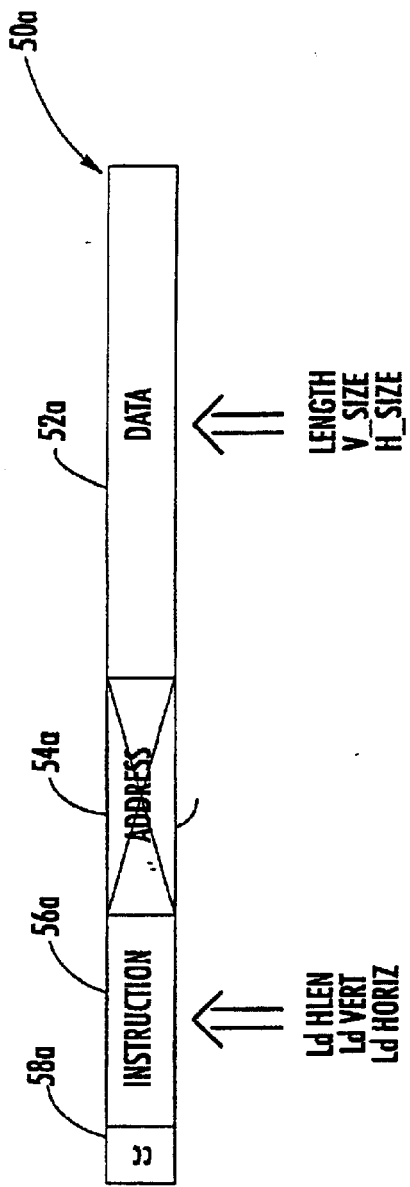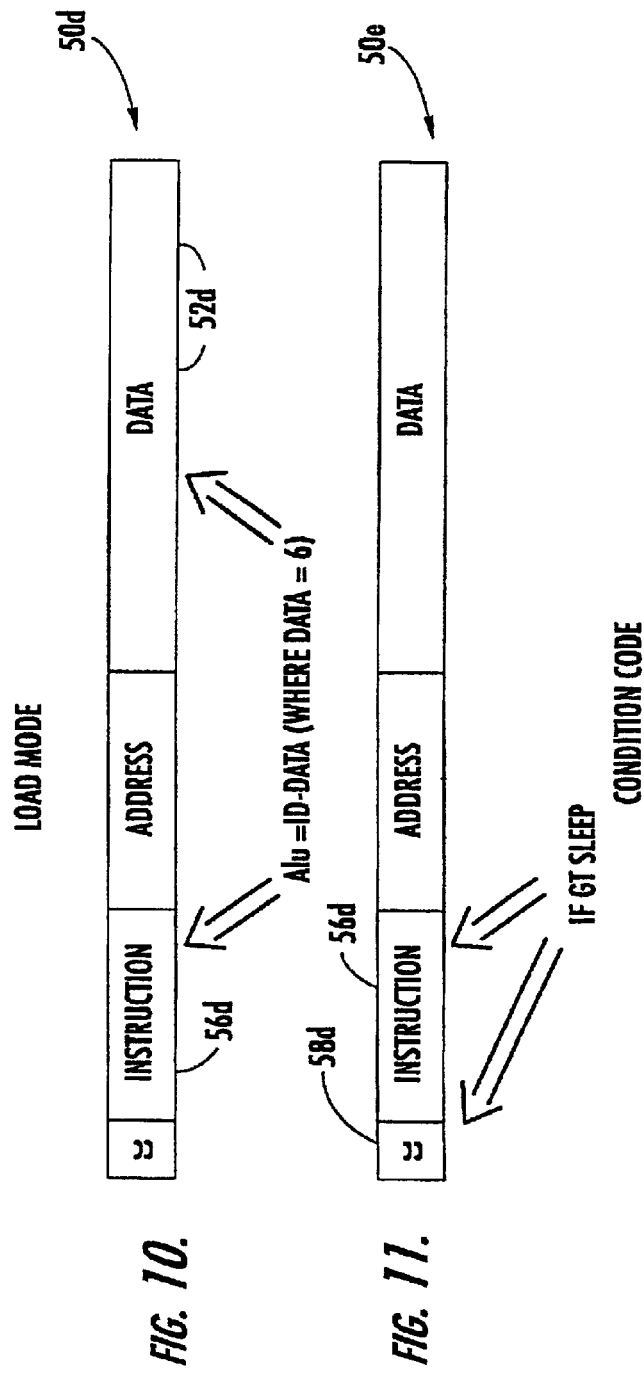

SINGLE INSTRUCTION MULTIPLE DATA ARRAY CELL

RELATED APPLICATIONS

This application claims priority over U.S. Provisional Application Ser. No. 60/350,398 entitled SINGLE INSTRUCTION MULTIPLE DATA (SIMD) ALU ARRAY to Kablotsky et al., filed Jan. 21, 2002.

FIELD OF THE INVENTION

This invention relates to a single instruction multiple data array cell for processing a direct access memory data stream.

BACKGROUND OF THE INVENTION

The high performance required for real-time processing in communications and multimedia applications stresses processor architectures in many different ways. The Single Instruction Multiple Data (SIMD) parallel-processing model that exploits the application's properties of natural parallelism is considered the most acceptable way to deliver the high performance need for both today's and future applications. The SIMD model assumes a plurality of processing cells. Each cell may include various combinations of hardware: address generators, multipliers, arithmetic logic units (ALUs), memory, registers, and sequencers. Generally, as the investment in hardware increases, the speed of processing goes up, but so does the power requirement, cost, and die area required. Cost and area are always considerations in hand held devices such as personal digital assistants (PDAs), cell phones, and other wireless handset terminals. Many different approaches have been used to address these problems. One approach, known as the very long instruction word (VLIW), VLIW architecture increases the speed by packing multiple operations into a single instruction word, which is then executed in parallel as a very wide instruction unit. However, this requires a very large register capacity and memory to store those instructions. The programming limitations of VLIW processors require engineers to use very low assembly programming to achieve high performance. Such programming requires specialized knowledge of the hardware architecture, which can be extremely complex. An alternative architecture to VLIW is Single Instruction Multiple Data (SIMD). This model assumes an array of processing cells each executing the same sequence of instruction on their local data. The key advantages of this approach are a reduction in overall hardware complexity, design regularity, the enhancement of computing resources and simplified path to software development. These come from the fact that only a single instruction-decode-and-dispatch is required. An example for such an array is the reconfigurable ALU array, offered by Elixent Limited of Bristol, England, which uses an array of four bit ALUs and register/buffer blocks. The ALUs are interwoven with adjacent cross bar switches. This results in a highly reconfigurable array but requires a large die area, a long time to accomplish the reconfiguring and a large number of buses. Yet another reconfigurable approach, the PACT, XPP, parallel processes the data by using processing array elements (PAE) where each of the PAE's uses an ALU and a few registers but is limited to only ALU types of operations without multiplication. In still another approach, using a multiple instruction multiple data (MIMD) array, each cell includes a full digital signal processor (DSP) that can change from a simple DSP up to a VLIW type; each DSP includes data address registers (DAGs), a compute block comprising at least one ALU, a shifter and a 16-bit multiplier with a register file, an instruction decoder and a sequencer. These systems are fast and versatile but they require very high power and very large die area. See the reconfigurable ALU array (RAA) at www.elixent.com. See also the XPP architecture at www.PACTCORP.com.

BRIEF SUMMARY OF THE INVENTION

It is therefore an object of this invention to provide an improved single instruction multiple data (SIMD) array cell for processing a data stream.

It is a further object of this invention to provide a SIMD array cell which uses less die area.

It is a further object of this invention to provide a SIMD array cell which eliminates the need for data address generators (DAG's) and all the associated Base, Index, Length, and Modify (B, I, L, M) registers.

It is a further object of this invention to provide a SIMD array cell which eliminates the need for a multiplier circuit by using a shift and add/subtract circuit.

It is a further object of this invention to provide a SIMD array cell which eliminates the need for registers in the arithmetic logic circuit by storing the data directly in memory.

It is a further object of this invention to provide a SIMD array cell which eliminates the need for loop logic and the associated registers by operating with absolute addresses.

It is a further object of this invention to provide a SIMD array cell which uses less power by replacing multiplication with additions/subtractions and very short shifts.

It is a further object of this invention to provide a SIMD array cell which powers down cells not required for a particular operation.

It is a further object of this invention to provide a SIMD array cell which eliminates the need for an in cell sequencer by using a single instruction-decode-and-dispatch mechanism.

The invention results from the realization that a truly improved single instruction multiple data array for processing a data stream, which is faster, and uses less power and less die area, can be achieved using a plurality of cells, which need no address generators or associated registers, each of which cells have a memory that stores a predetermined region of the data stream, a location register for representing the size and location of that region, a unique identification number and an arithmetic logic unit responsive in a load mode to the identification number and a single command word common to all cells to compute the unique start position for its cell for receiving the predetermined region of the direct memory access data stream. In an execution mode the command word includes an address field applicable to all cells, a data field and an instruction to be performed by the arithmetic logic unit. The arithmetic logic unit in each cell performs the instruction directly on the local value at that address in its memory with the data in the data field.

This invention features a single instruction multiple data (SIMD) array cell for processing a data stream, the array including a plurality of cells, each cell including a memory circuit for storing a predetermined region of the data stream, a location register circuit for representing the size and location of the predetermined region of the data stream, a unique identification number stored in its ID register circuit and an arithmetic logic unit responsive to the identification number and a single command common to all cells in a load mode to compute a unique start position for its cell for receiving the predetermined region of the data stream.

In a preferred embodiment, the arithmetic logic unit may include an adder circuit. The arithmetic logic unit may include a shifter circuit for performing multiplication and accumulation in combination with the adder circuit. The arithmetic logic unit may include an arithmetic logic circuit. The command word may include in an execution mode an address field applicable to all cells. The arithmetic logic unit may operate directly on the values stored at that address in its cell memory with the data in the data field. The command word in the execution mode may include an instruction field for operating the arithmetic logic unit. The arithmetic logic unit may include a multiplexor for presenting input from the memory circuit, the command word, and the output of the arithmetic logic unit. Each cell may include a condition code register and the arithmetic logic unit may respond to the unique identification number and the condition code register to control the condition of the cell. The location register circuit may store a start position for the predetermined region to be stored in its memory, the length of the direct memory access data stream to be stored, and at least one dimension of the data stream. The location register may store the vertical and horizontal dimensions of the data stream. The command word in the execution mode may establish the size and location of the predetermined region in the location register circuit. The command word may include an address field for addressing locations in the predetermined region of interest in the memory circuit. The command word in the execution mode may include a data field for operating the arithmetic logic unit. The condition code register and arithmetic logic unit may respond to the unique identification number, the data field, to control the condition of the cell.

BRIEF DESCRIPTION OF THE DRAWINGS

Other objects, features and advantages will occur to those skilled in the art from the following description of a preferred embodiment and the accompanying drawings, in which:

FIG. 5 is a schematic illustration of the format of the command word used with this invention;

FIG. 6 is a view similar to FIG. 5 depicting variations of the command in the execute mode for loading the location registers of FIG. 3;

FIG. 7 is a view similar to FIG. 5 showing variations in the command in the load mode for access of a data stream;

FIG. 9 is a view similar to FIG. 5 of the command word in the execute mode for carrying out a single instruction simultaneously on the local data stored at the same address in each memory of each cell all operated on by the same global data dispatched in the command;

FIGS. 10 and 11 are views similar to FIG. 5 showing the variations in the command during a condition code operation to put certain selected cells into sleep condition.

PREFERRED EMBODIMENT

Figure 1:
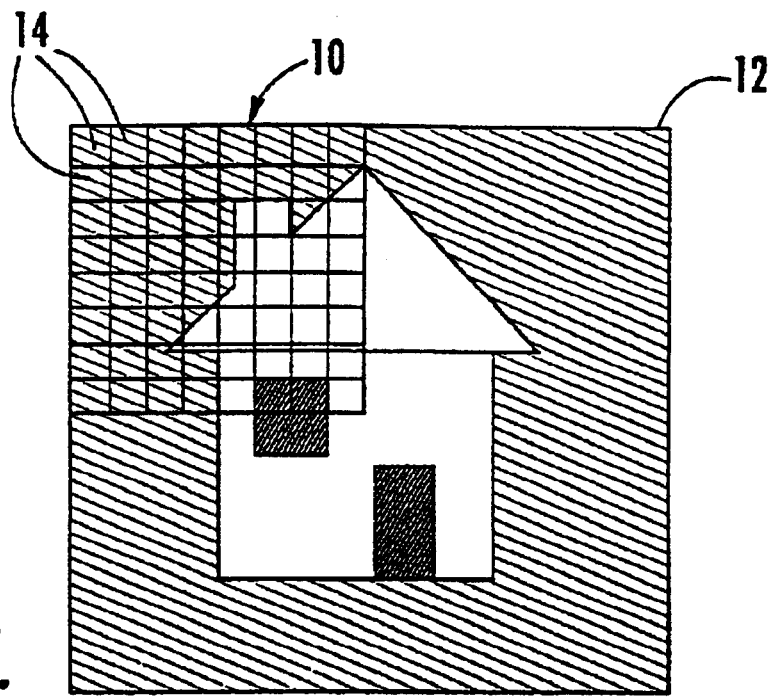
FIG. 1 is a schematic diagram of an single instruction multiple data array superimposed on a portion of an image.
Figure 2:
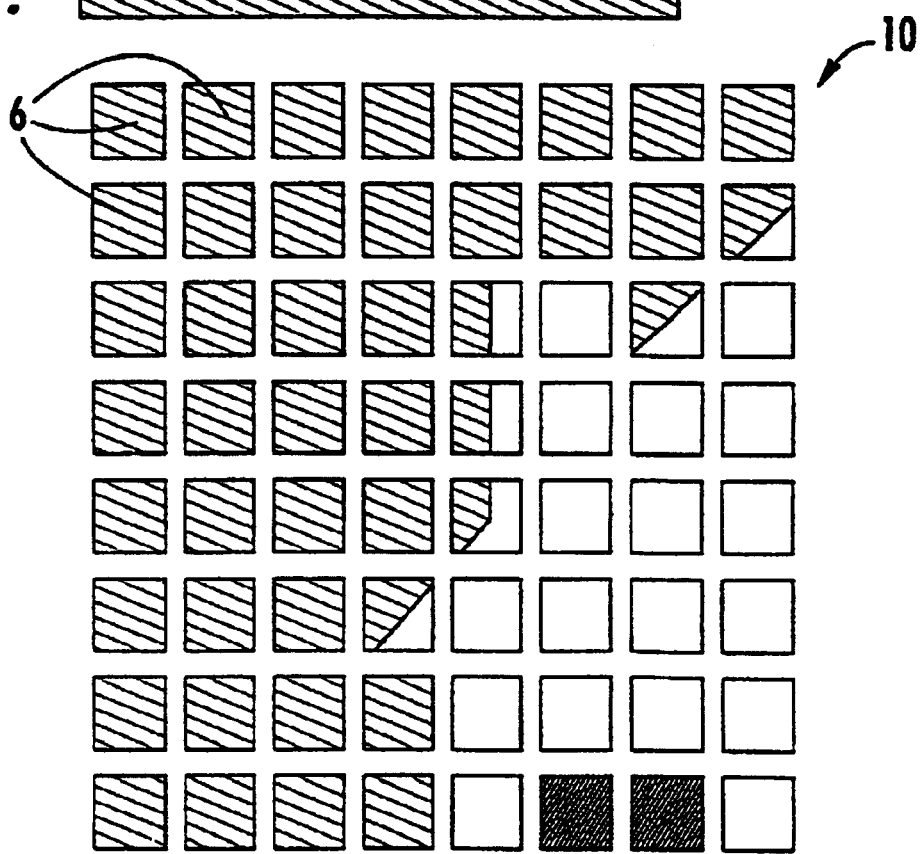
FIG. 2 is an exploded schematic diagram showing the memories associated with each of the array cells in FIG. 1 arranged to depict the portion of the picture stored in them.

There is shown in FIG. 1 a single instruction multiple data array 10 capable of storing, in this example, one quarter of the total image 12. Array 10, in this embodiment, includes an 8×8 array of 64 cells 14, each of which contains a memory unit shown schematically at 16, FIG. 2, arranged in array 10 to represent the upper left quarter of image 12.

Figure 3:
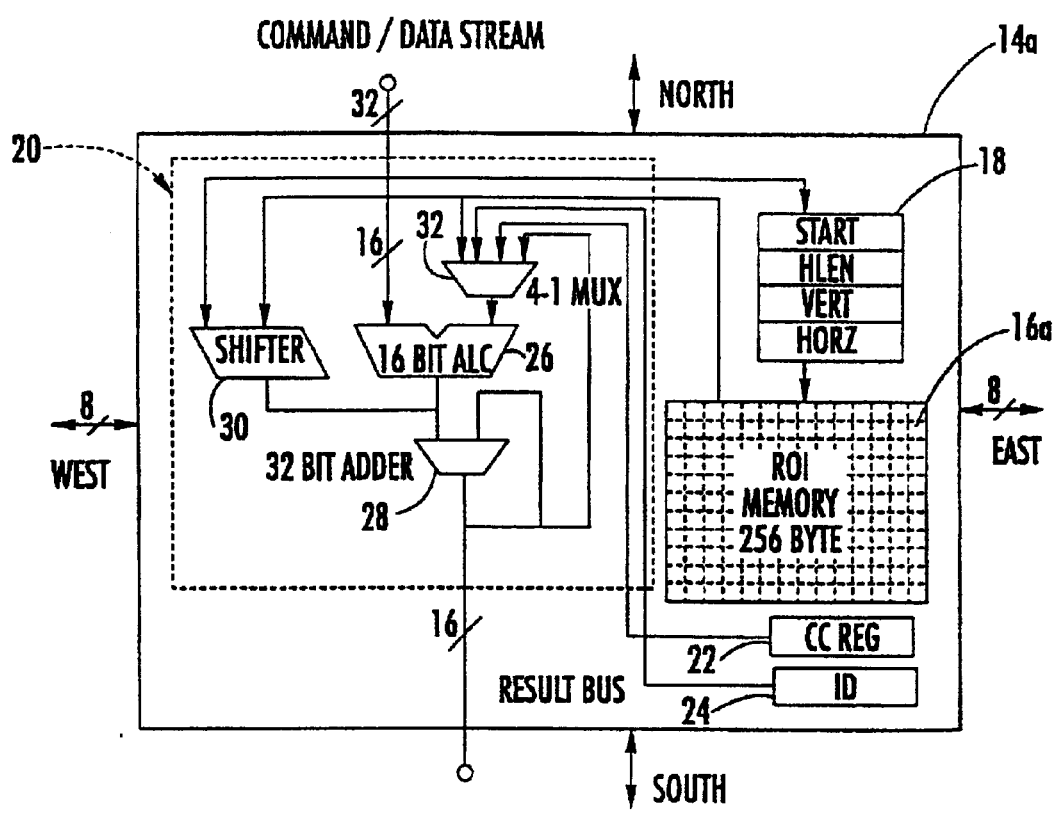
FIG. 3 is a schematic diagram of a single instruction multiple data array cell according to this invention.
Figure 4:
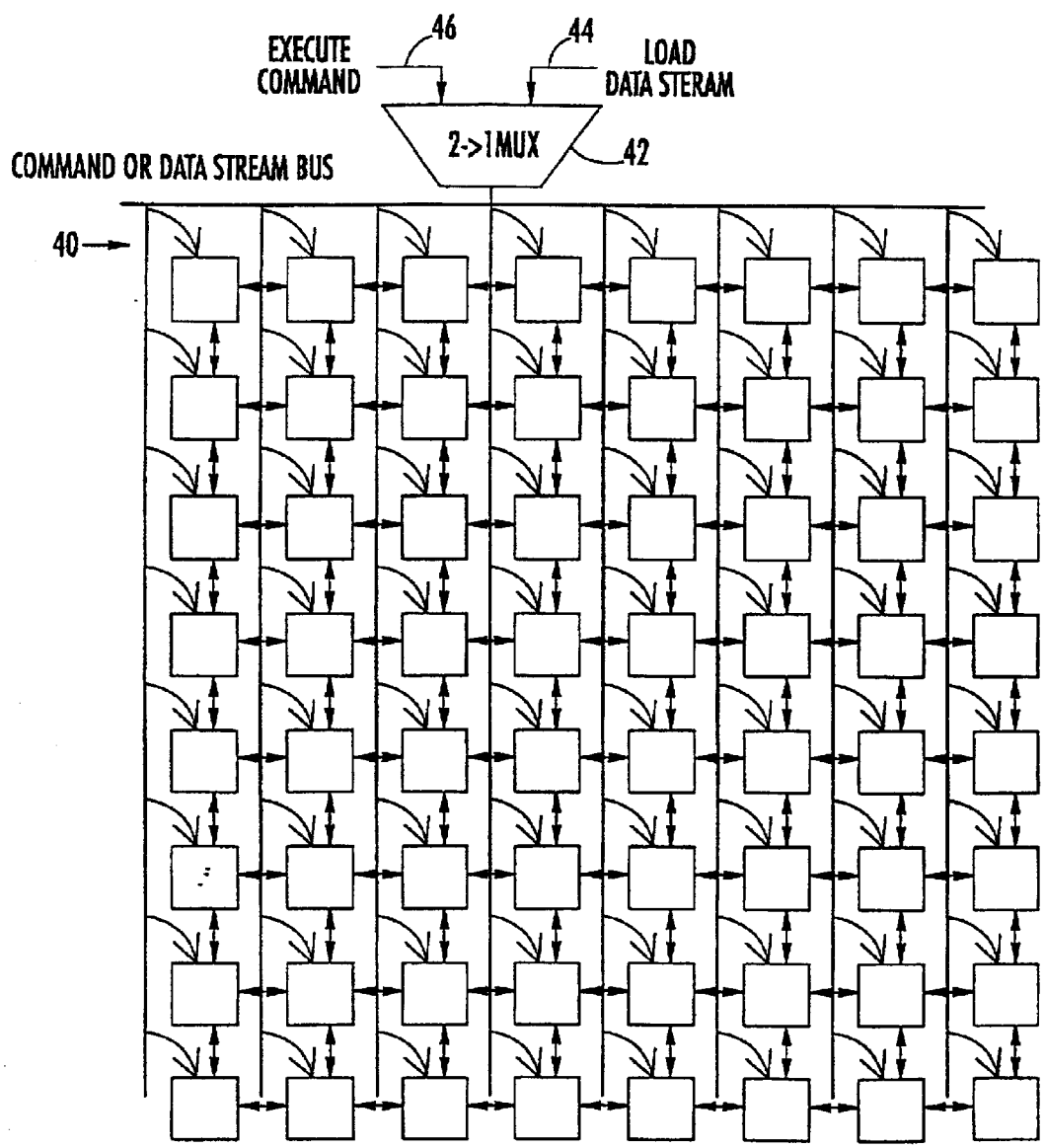
FIG. 4 is a schematic diagram of the single instruction multiple data array employing a number of cells according to this invention.

Each cell 14a, FIG. 3 includes, in addition to memory 16a, a location register circuit 18, an arithmetic logic unit 20, a condition code register 22, and an identification number register 24. Memory 16a is a region of interest memory of 256 bytes or pixels. That is, it may hold an area sixteen pixels on a side representing the region of interest (ROI) of image 12, FIG. 1. The location and size of the region of interest stored in memory 16a is represented in location register circuits 18 which contains the starting point for the data, the length of the data stream, and at least one dimension such as the vertical or horizontal or both. For two-dimensional data streams such as images, both would be utilized; for signal processing where the data stream is one-dimensional, only one, for example the horizontal value, need be available. Arithmetic logic unit 20 includes an arithmetic logic circuit 26, an adder 28, and a shifter 30 so that both addition and multiplication by additions/subtractions and shifting can be accomplished. A 4:1 multiplexor 32 provides one input to arithmetic logic circuit 26. That input to arithmetic logic circuit 26 may be the fed-back signal at its own output from adder 28 or the signal from the condition code register 22 or the data from the ROI memory 16a or the identification number from identification number register 24. The identification number register 24 holds a number which is unique for each cell, for example referring again to FIG. 1, the top row of cells 14 may be identified as 0–7, the second row as 8–15, the third row as 16–23 and so on till the last row of 56–63. All of the cells 14, FIG. 4, are connected to their neighboring cells and are also serviced by a command/access bus 40. Bus 40 may be a direct memory access bus or the data may come from a processor or core itself in either the load or execution mode. The single instruction multiple data arrangement is delivered by 2:1 multiplexor 42 which provides, for example, either the direct memory access (DMA) data stream on line 44 in the load mode or a command word on line 46 in the execute mode. Bus 40 is a 32-bit bus. The format of the command 50, FIG. 5, includes a 16 bit data field 52 from bit 0 to bit 15, an 8 bit address field 54 from bit 16 to bit 23, an instruction field 56 from bit 24 to bit 30, and a 2 bit code condition field 58 from bit 30 to bit 31.

Figure 8:
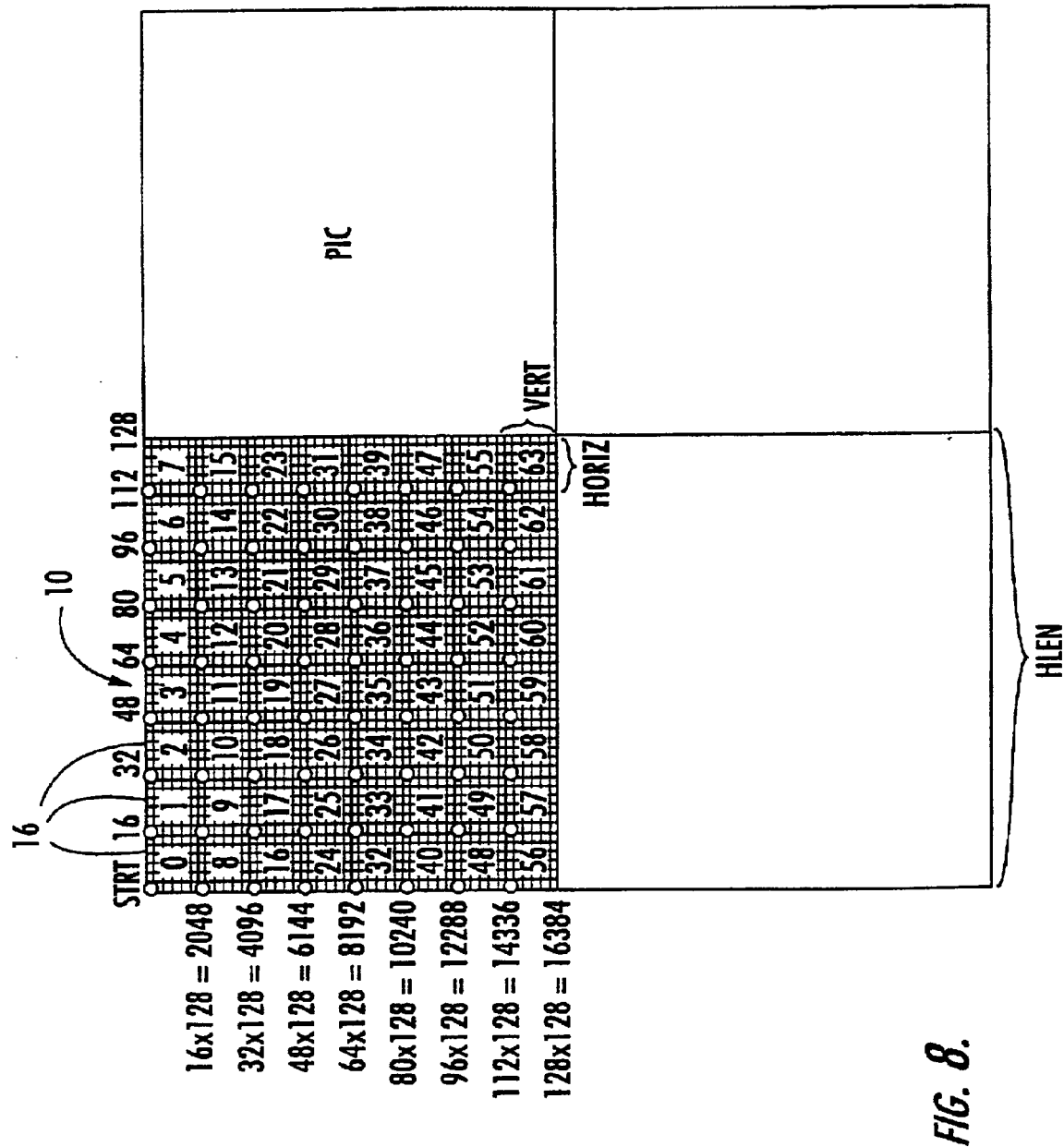
FIG. 8 is a schematic diagram illustrating the derivation of certain vertical and horizontal dimensions and start position stored in the location register circuit.

In operation, in the execute mode, FIG. 6, in order to define the (ROI-DMA) parameters the command 50a will hold in the instruction field 56a either the instruction Ld Hlen, Ld Vert or Ld Horiz to variously load the Hlen, Vert, and Horiz values, as shown in FIG. 8, in location register circuit 18, FIG. 3. Because all array processing elements are processing the same patch size, the particular length or size for those characteristics are simultaneously loaded in the data field 52a. The address field 54a and condition code field 58a are not used in this operation. Horiz is the patch horizontal length to be stored in each of a memory 16, Vert is the patch vertical length of each memory 16, which in this embodiment are sixteen because each memory 16 is composed of a square sixteen by sixteen byte matrix. Hlen is the combined length of the horizontal portion of the data stream being deposited in all memories 16 or each array row. For example, in FIG. 8 where cells 0, 1, 8, and 9 are being loaded in a raster pattern the data must be received in one hundred twenty eight bytes/line, line after line until the memories in all four cells 0, 1, 8, 9 have been loaded.

In loading mode the tightest rectangle that contains all the data points (N×N×ROI) needed to be processed by the N×N array is raster broadcasted across the arrays DMA bus. Each one of the array members receives the broadcast data and grabs its own region of interest data according to the settings of his own location register circuit. In, FIG. 7, the command word 50b provides a sequence of instructions to program each cell's register starting point as a function of its unique identification number to a different value using the same dispatched instruction. The start value is installed in location register circuit 18 using the command 50a, FIG. 6, where the instruction sequence establishes the start point of the region of interest in each memory 16, by combining the identification number from identification number register 24 with the data 52a from the command word 50a, FIG. 6, in accordance with the instructions 56a.

For example, in order to set the starting point of cells 0, 1, 8, 9, . . . of FIG. 8, the following instruction sequence Strt=Alu=(Id>>3)<<11+(ID && 7)<<4, (where shift left is indicated by <<, shift right by >> and bit-wise and by &&) should be executed by the arithmetic logic unit 26 shifter 30 and adder 28 in each cell. To illustrate for Id=9 Start=2048+16, because, Strt=Alu=Fix(Id/8)*2048+(Id && 7)*16= 2048+16. For the next row beginning with the identification number 16, using the same formula will get Strt=Alu=Fix (Id/8)*2048+(Id && 7)*16=2*2048+0*16, and so on.

In the execution mode, the instruction field 56c, FIG. 9, instructs the ALU to operate on the data in the memory at address field 54c with the data in data field 52c: ALU+= MEM(address)<<data is a single instruction which tells each cell to go to that address in its memory and to operate on it with the data in field 52c. The operation is typically a shifting and add to effect multiplication. The instruction field 56c can have up to 64 different types where the most common are MIN, MAX, ACS (Add Compare Select) and all the bit-wise operations like OR, AND, and XOR. It is the use of this single instruction on multiple data which dramatically increases the speed of operation. The common command word holds a single instruction, a single address and a single piece of data. The single address addresses the same place in each memory of each cell; the single instruction causes each ALU to operate in accordance with the single instruction on the data at that address in each memory with the piece of data in the data field of the common command word. The operation takes place simultaneously in all cells at the same time. In this embodiment, where all sixty-four cells are simultaneously processing the data they have at that specific memory address with the data supplied by command 50c, the time of operation is reduced by a factor equal to the number of cells involved: where sixty-four cells are operating simultaneously, the operation is sixty-four times faster.

Condition code register 22 maintains the status of the ALU in its particular cell. For example, when command 50d, FIG. 10, contains the instructions ALU=ID-data that instruction is held in the instruction field, 56d and the data referred to is contained in the data field 52d. Assume the particular instruction in FIG. 10 desires to put to sleep all cells above the identification number 6. Therefore the data in data field 52d will be a 6. Once this operation has been carried out by the ALU, the next command word 50e, FIG. 11, may contain in the condition code field 58d the condition, "if greater than put the cells to sleep (if GT sleep)". This capacity to put to sleep cells that are not being used, contributes greatly to the lower power consumption of the SIMD according to this invention. The condition code field 58d actually includes two flags, an AZ flag which indicates ALU=0 and AN which indicates ALU is negative. These flags are used constantly to monitor the status of each of the cells. It can be used in a variety of ways not here pertinent. In this particular case, to induce the sleep mode, if the flags indicate that it is not 0 and not negative with respect to the ALU then it must be greater and if its greater than the ALU (which is 6), according to the operation described in FIGS. 10 and 11, the cell will be put to sleep.

Figure 12:
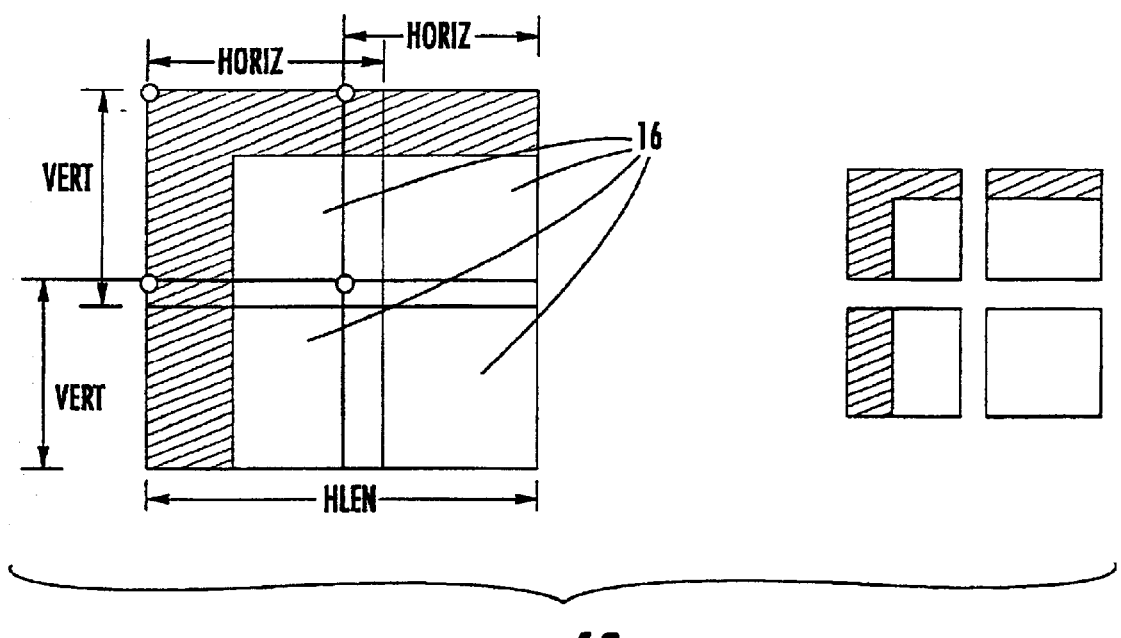
FIG. 12 illustrates operation in a cell overlap arrangement.

Although in the example thus far the memories are used to full capacity and they all start loading neatly in the upper left corner, these are not necessary limitations of the invention. Only a portion of each memory need be used and loading could be anywhere. The example so far uses a "two-dimensional" data stream, that is it represents an image but this is not a limitation. The data stream could as well be a one-dimensional data stream such as sound for example with the same applicability and advantages. In the example thus far, too, the data stored in the memories is neatly contiguous but this need not be either. In the case illustrated in FIG. 12, where the memories overlap, the Horiz and Vert lengths are unaffected but Hlen is less than twice the Horiz value as it was before. One benefit of this overlapping is that in the single overlap areas 100, 102, 104, 106 one piece of data actually loads in two memories. In the double overlap area 108 one piece of data loads in four memories simultaneously which decreases overall loading time.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A single instruction multiple data (SIMD) array cell for processing a data stream, said array including a plurality of cells, each cell comprising:

a memory circuit for storing a predetermined region of the data stream;

a location register circuit for representing the size and location of the predetermined region of the data stream;

a unique identification number; and an arithmetic logic unit responsive to said identification number and a single command common to all cells in a load mode to compute the unique start position for its cell for receiving the predetermined region of the direct memory access data stream.

2. The single instruction multiple data array of claim 1 in which said arithmetic logic unit includes an adder circuit.

3. The single instruction multiple data array of claim 2 in which said adder circuit includes a shifter circuit for performing in combination with said adder circuit multiplication and accumulation.

4. The single instruction multiple data array of claim 1 in which said arithmetic logic unit includes an arithmetic logic circuit.

5. The single instruction multiple data array of claim 1 in which the command word in an execution mode includes an address field applicable to all cells and a data field and said arithmetic logic unit operates directly on the value stored at that address in its cell's memory with the data in the data field.

6. The single instruction multiple data array of claim 5 in which said command word in said execution mode includes an instruction field for operating said arithmetic logic unit.

7. The single instruction multiple data array of claim 1 in which said arithmetic logic unit includes a multiplexor for presenting inputs from said memory circuit, said command word, said unique identification number, and the output of the arithmetic logic unit.

8. The single instruction multiple data array of claim 1 in which each said cell includes a condition code register and said arithmetic logic unit responds to said unique identification number and said condition code register to control the condition of the cell.

9. The single instruction multiple data array of claim 1 in which said location register circuit stores a start position for the predetermined region to be stored in its memory, the length of the direct memory access data stream to be stored and at least one dimension of the data stream.

10. The single instruction multiple data array of claim 9 in which said location register circuit stores the vertical and horizontal dimension of the data stream.

11. The single instruction multiple data array of claim 1 in which said command word in the execution mode establishes the size and location of predetermined region in the location register circuit.

12. The single instruction multiple data array of claim 1 in which said command word includes an address field for addressing locations in said predetermined region of interest in said memory circuit.

13. The single instruction multiple data array of claim 6 in which said command word in said execution mode includes a data field for operating said arithmetic logic unit.

14. The single instruction multiple data array of claim 5 in which each said cell includes a condition code register and said arithmetic logic unit responds to said unique identification number, said data field, and said condition code register to control the condition of the cell.

* * * * *